United States Patent
Matsunaga et al.

(10) Patent No.: US 7,602,764 B2
(45) Date of Patent: Oct. 13, 2009

(54) COMMUNICATION TIMING CONTROL METHOD AND APPARATUS, NODE, AND COMMUNICATION SYSTEM

(75) Inventors: Toshihiko Matsunaga, Osaka (JP); Masaki Yamauchi, Osaka (JP); Masaaki Date, Osaka (JP); Shigeru Fukunaga, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 652 days.

(21) Appl. No.: 11/072,234

(22) Filed: Mar. 7, 2005

(65) Prior Publication Data

US 2005/0195771 A1 Sep. 8, 2005

(30) Foreign Application Priority Data

Mar. 8, 2004 (JP) ............................. 2004-064619

(51) Int. Cl.
*H04J 3/06* (2006.01)
(52) U.S. Cl. .................... 370/350; 370/503; 370/516; 375/356
(58) Field of Classification Search ................. 370/241, 370/343, 350, 390, 485, 503–516; 725/107; 375/354–362
See application file for complete search history.

(56) References Cited

U.S. PATENT DOCUMENTS

| | | | | |
|---|---|---|---|---|
| 4,156,847 | A * | 5/1979 | Tazawa et al. | 725/107 |
| 5,483,518 | A * | 1/1996 | Whetsel | 370/241 |
| 6,307,868 | B1 * | 10/2001 | Rakib et al. | 370/485 |
| 6,381,236 | B1 * | 4/2002 | Miyashita et al. | 370/343 |
| 6,522,650 | B1 * | 2/2003 | Yonge et al. | 370/390 |
| 7,522,640 | B2 | 4/2009 | Date et al. | |
| 2005/0068934 | A1 * | 3/2005 | Sakoda | 370/350 |
| 2005/0124344 | A1 * | 6/2005 | Laroia et al. | 455/436 |
| 2005/0185628 | A1 | 8/2005 | Watanabe et al. | |
| 2005/0210157 | A1 | 9/2005 | Sakoda | |

FOREIGN PATENT DOCUMENTS

| | | |
|---|---|---|
| JP | 07143558 A | 6/1995 |
| JP | 2004350093 A | 12/2004 |
| JP | 2005094663 A | 4/2005 |
| JP | 2005253038 A | 9/2005 |
| JP | 2005253047 A | 9/2005 |

OTHER PUBLICATIONS

Waiyaresu LAN Akitekucha (Wireless LAN Architecture) edited by Matsushita et al., Kyoritsu Shuppan, 1996, pp. 49-71.

\* cited by examiner

*Primary Examiner*—Ricky Ngo
*Assistant Examiner*—Pao Sinkantarakorn
(74) *Attorney, Agent, or Firm*—Venable LLP; Michael A. Sartori

(57) ABSTRACT

A communication timing control apparatus for use in the nodes of a communication system includes a signal communication unit that transmits a state variable signal to neighboring nodes and receives state variable signals from those nodes. An external control signal, such as a beacon signal transmitted by a control node, is also received. The state variable signals indicate internal operating states or timings of the nodes; the control signal indicates a basic transition rate. A timing decision unit causes internal state or timing transitions to occur at timings responsive to the basic transition rate and the received state variable signals, adjusting the transition timings so as to avoid signal collisions and to adapt to changing system conditions, Use of the control signal enables a steady timing state to be reached quickly.

12 Claims, 8 Drawing Sheets

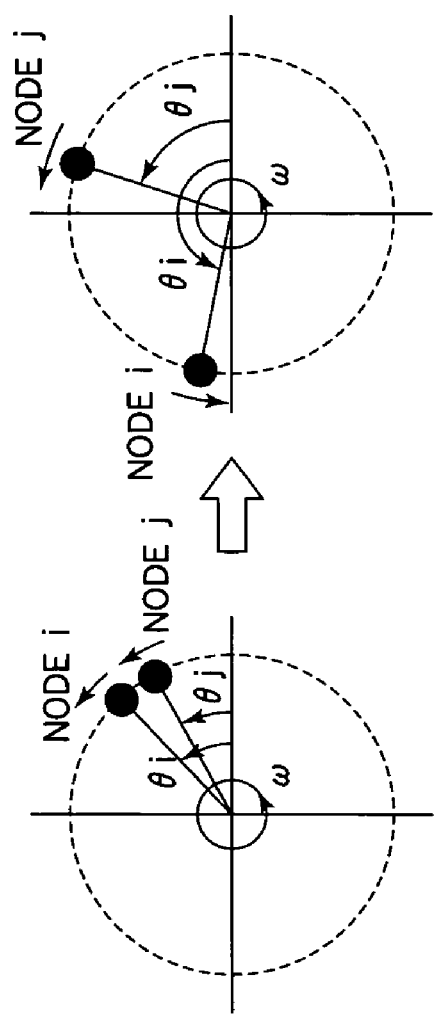
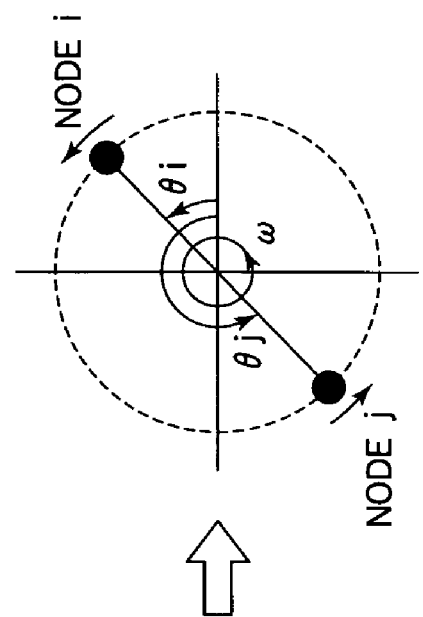
FIG.3A  FIG.3B  FIG.3C

COMMUNICATION TIMING CONTROL METHOD AND APPARATUS, NODE, AND COMMUNICATION SYSTEM

BACKGROUND OF THE INVENTION

1. Field of the Invention

The present invention relates to a communication timing control method, a communication timing control apparatus, a node, and a communication system, more particularly to the avoidance of data transmission collisions in a communication system with a plurality of nodes.

2. Description of the Related Art

Known methods by which a plurality of spatially distributed nodes can transmit data without collisions include time division multiple access (TDMA) and carrier sense multiple access (CSMA), the latter including carrier sense multiple access with collision avoidance (CSMA/CA) and carrier sense multiple access with collision detection (CSMA/CD). A discussion of these methods can be found in, for example, Waiyaresu LAN Akitekucha (Wireless LAN Architecture), edited by Matsushita and Nakagawa, Kyoritsu Shuppan, 1996, pp. 47, 53-59, and 69 (in Japanese).

In the CSMA methods, a node with data to transmit determines whether other nodes are transmitting by sensing their carrier signals, and waits until no other node is transmitting before transmitting itself. A disadvantage of CSMA is that it severely restricts the number of channels that can be used simultaneously.

In the TDMA method, different time slots are assigned to different nodes, and each node transmits data in its own assigned time slot. TDMA can provide more simultaneous communication channels than CSMA, but when the set of communicating nodes changes dynamically, an administrative node must reassign the time slots dynamically.

A weakness of the TDMA system is that if the administrative node malfunctions, the entire communication system may be brought down. The process by which time slots are assigned dynamically to nodes is also complex, making it difficult to respond promptly to changing conditions. A further problem is that the width of the time slots cannot be changed.

It would be desirable to have a more flexible method and apparatus for controlling communication timing, so that each node could communicate effectively without having to receive timing control instructions from an administrative node.

SUMMARY OF THE INVENTION

An object of the present invention is to provide a method of avoiding signal collisions in a communication system by autonomous control of the communicating nodes.

Another object of the invention is to enable the nodes to adjust flexibly and autonomously to changing conditions in the communication system.

Yet another object is to enable timing control in the nodes in the communication system to reach a steady state quickly.

In the invented communication timing control method, each general node in the communication system receives, from one or more other nodes in the communication system, input state variable signals indicating an operating state or operating timing of the other nodes. The node also receives a control signal indicating a basic transition rate. The node generates transitions in its internal operating state or operating timing at the indicated basic transition rate but at times adjusted according to the input state variable signals received from the other nodes, generates an output state variable signal according to these transitions, and transmits the output state variable signal to the other nodes. All nodes in the communication system receive the same control signal, or a relayed copy thereof, and accordingly operate at the same basic transition rate.

By adjusting their internal transition timings, a group of neighboring nodes can autonomously reach a steady state in which the state variable signals transmitted from different nodes are separated by intervals that can be used as time slots for data communication. When the system undergoes a change, the nodes affected by the change can adjust autonomously and reach a new steady state. The steady state can be reached quickly because all nodes operate at the same basic transition rate.

The invention also provides a communication timing control apparatus employing the invented method, a node including the invented communication timing control apparatus, a control node for generating and transmitting the control signal, a slave node for relaying the control signal, and communication systems including various combinations of these nodes.

BRIEF DESCRIPTION OF THE DRAWINGS

In the attached drawings:

FIG. 3A illustrates an initial state during communication between two neighboring nodes according to the invention;

FIG. 3B illustrates a transitional state during communication between the two neighboring nodes;

FIG. 3C illustrates the steady state during communication between the two neighboring nodes;

DETAILED DESCRIPTION OF THE INVENTION

Figure 1:
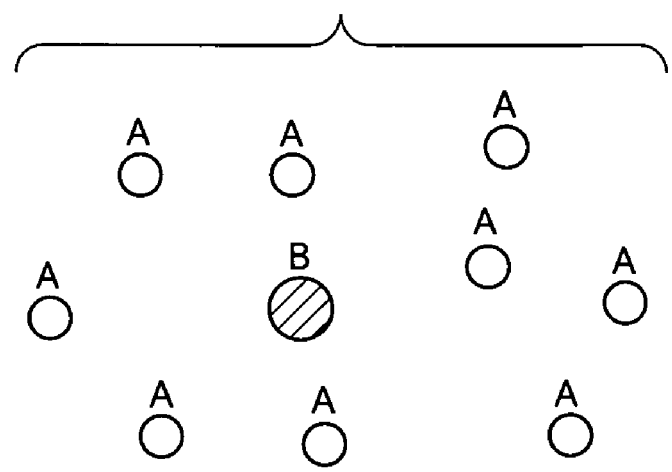
FIG. 1 schematically depicts a communication system comprising a plurality of nodes.

Embodiments of the invention will now be described with reference to the attached drawings, in which like elements are indicated by like reference characters.

Referring to FIG. 1, the communication system in the first three embodiments is a network comprising a spatially distributed plurality of general nodes A that transmit data signals, and a single beacon node B that transmits a beacon signal. The nodes A and B may be stationary or mobile. One of the general nodes A may act as the beacon node B as well as performing its own communication functions.

The beacon signal functions as the control signal in the communication system. Each general node A transmits impulse signals at a rate determined from the beacon signal; these impulse signals function as the state variable signals. Neighboring nodes interact by detecting each other's impulse signals, autonomously adjust their own impulse signal timing, and thereby establish time slots in which they can communicate without signal collisions.

First Embodiment

Figure 2:
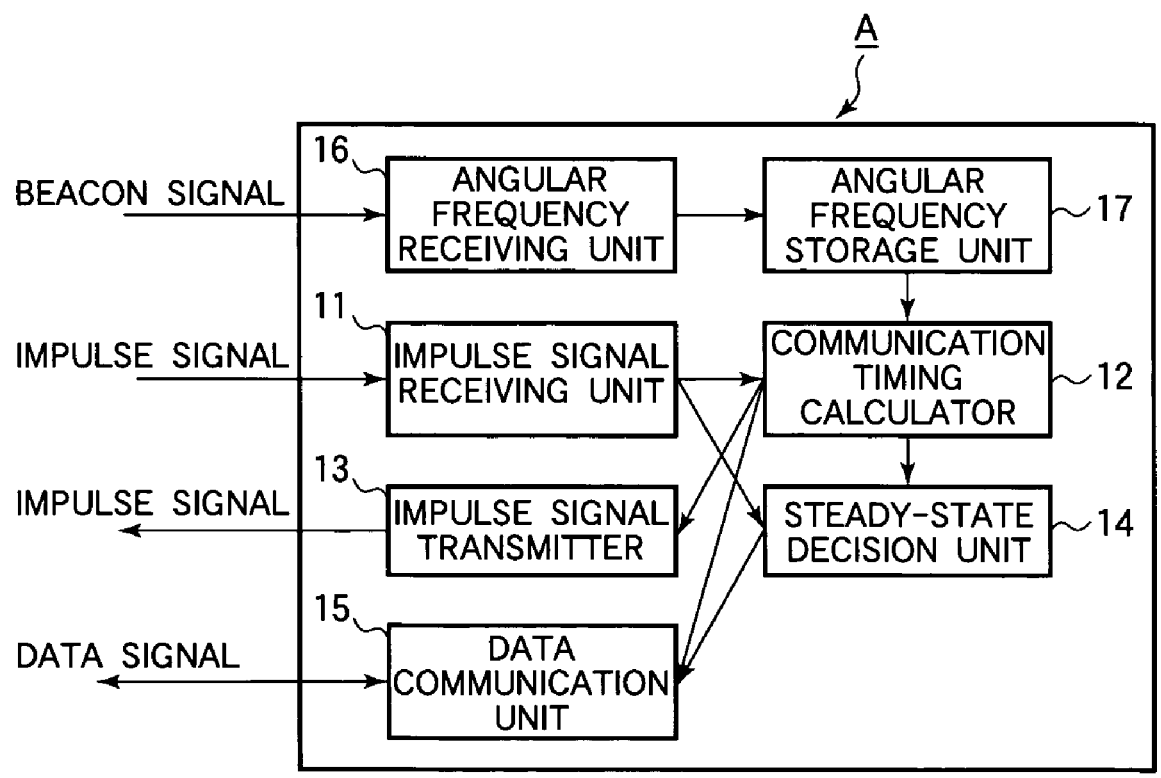
FIG. 2 is a functional block diagram showing the internal structure of a general node in FIG. 1 according to a first embodiment of the invention.

Referring to FIG. 2, each general node A in the first embodiment comprises an impulse signal receiving unit 11, a communication timing calculator 12, an impulse signal transmitter 13, a steady-state decision unit 14, a data communication unit 15, an angular frequency receiving unit 16, and an angular frequency storage unit 17. The impulse signal receiving unit 11, communication timing calculator 12, impulse signal transmitter 13, steady-state decision unit 14, angular frequency receiving unit 16, and angular frequency storage unit 17 combine to function as a communication timing control apparatus.

The impulse signal receiving unit 11 receives impulse signals transmitted by neighboring nodes A. An impulse signal is a signal received as a timing signal, not including any data. The impulse signal may have, for example, a Gaussian waveshape. The neighboring nodes include, for example, all nodes within communication range. The impulse signal receiving unit 11 sends each received impulse signal, or a reshaped version of the impulse signal, or a signal generated from the received impulse signal, to the communication timing calculator 12 and steady-state decision unit 14.

The communication timing calculator 12 generates and outputs a phase signal that determines the transmission timing of its own node, based on the signal furnished from the impulse signal receiving unit 11. At the i-th node, the communication timing calculator 12 generates a phase signal $\theta_i(t)$ with a value that is advanced by the amount given in equation (1) below at successive times t. This equation models a type of nonlinear oscillation. The invention is not limited to the use of this particular model; other equations that model nonlinear oscillation may be used instead. The phase value may be regarded as a state variable of the node, and the phase signal $\theta_i(t)$ as a state variable signal.

$$d\theta_i(t)/dt = \omega + \sum_{k=1}^{N} P_k(t) \cdot R(\theta_i(t), \sigma(t)) \quad (1)$$

$$R(\theta_i(t), \sigma(t)) = \sin(\theta_i(t) + \sigma(t)) \quad (2)$$

$$\sigma(t) = \pi + \phi(t)$$

$\theta_i(t)$: phase signal of node i
$\omega$: natural angular frequency parameter
$P_k(t)$: received impulse signal received from node k
$R(\theta_i(t), \sigma(t))$: phase response function
$\phi(t)$: random noise function Equation (1) is essentially a rule for generating variations in the rhythm of operation of the i-th node in response to signals furnished from the impulse signal receiving unit 11. The variable t represents continuous time, and $\omega$ is a natural angular frequency parameter representing the natural angular frequency of the node's rhythm of operation. The function $P_k(t)$ expresses the value at time t of the output from the impulse signal receiving unit 11 for the received impulse signal received from neighboring node k (k=1 to N). N is the total number of neighboring nodes within spatial receiving range, capable of producing a received impulse signal. The function $R(\theta_i(t), \sigma(t))$ is a phase response function that determines how the basic period or rhythm is varied in response to the received impulse signals, and may be defined as in, for example, equation (2) which adds random noise in complementary phase to the phase value $\theta_i(t)$.

Equations (1) and (2) have a nonlinear operating characteristic that acts as a repulsion rule by attempting to move the timing phase of each node away from the timing phases of the neighboring nodes with which it interacts. More specifically, if two neighboring nodes are operating in phase with each other, so that they have the same transmission timing, for example, and their transmissions collide, equations (1) and (2) operate so as to move the nodes away from this timing relationship, so that they operate with an appropriate phase difference.

The constant term $\pi$ in equation (2) attempts to establish a complementary phase relationship between neighboring nodes. The random noise function $\phi(t)$ gives the nonlinear characteristic a random variability by generating noise (random values) according to, for example, a Gaussian probability distribution with a mean value of zero. The random variability is added to keep the system from becoming trapped in a locally stable state (local solution) other than the desired stable state (optimal solution).

The phase response function $R(\theta_i(t), \sigma(t))$ in equation (2) above is a sine function, but the invention is not limited to the use of a sine function, and the constant term is not limited to $\pi$. The constant term may be any constant $\lambda$ other than zero or an even multiple of $\pi$ (e.g., any value in the range $0<\lambda<2\pi$). If a constant other than $\pi$ is used, the result will be that neighboring nodes attempt to assume different but not reverse phases.

The above computational operations will be explained in further detail with reference to drawings that show how the phases of two or three nodes are forced apart over time.

FIGS. 3A, 3B, and 3C illustrate this process when there is just one neighboring node j near the node of interest i. FIG. 3A shows an exemplary initial state, when the system starts operating. Nonlinear oscillation is modeled by the motion of the two point masses rotating around a circle, expressing the timing phase of nodes i and j. If the rotational motion of a point mass is projected onto the vertical axis or horizontal axis, the motion of the projected point exhibits harmonic nonlinear oscillation. From equation (1), a nonlinear characteristic operating on the two mass points attempts to bring them into complementary phases, so with elapse of time the initial state in FIG. 3A passes through a transitional state such as the one in FIG. 3B and finally settles into the steady state shown in FIG. 3C in which the two point masses are substantially $\pi$ radians out of phase with each other.

The two point masses rotate with a basic angular velocity (equivalent to the basic rate of transitions in the operating states of their nodes) given by the natural angular frequency parameter $\omega$. The point masses interact by transmission and reception of impulse signals, alter (quicken or slow) their angular velocities as a result of the interaction, and reach a steady state in which a complementary phase relationship is maintained. This process can be understood as operating by mutual repulsion of the two point masses as they rotate. In the stable state, if each node transmits at a predetermined phase α (for example, α=0), the transmission timings will have an appropriate temporal relationship.

Figures 4A, 4B, 4C:
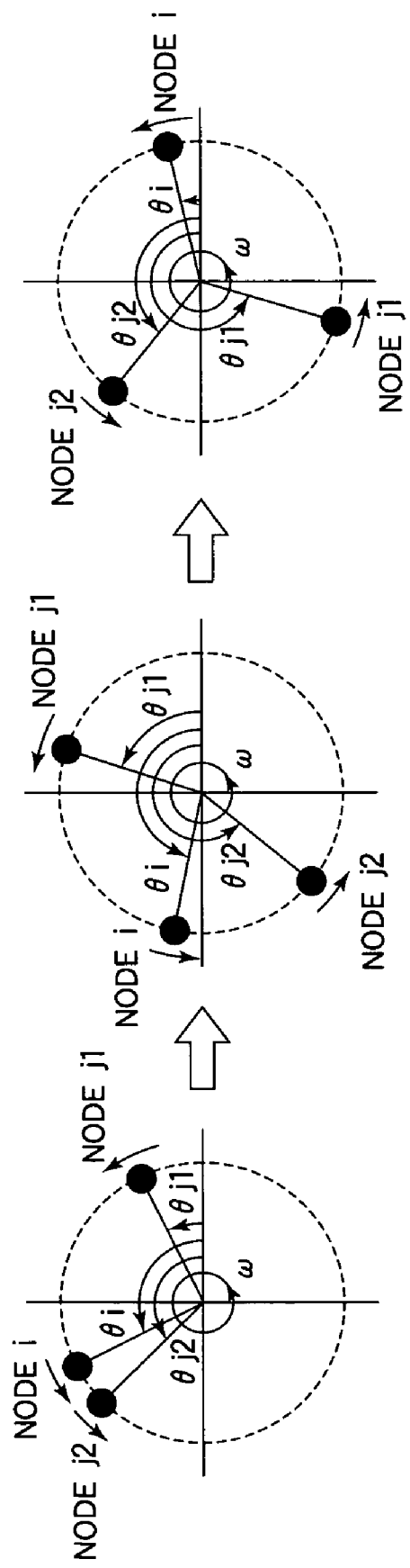
FIG. 4A illustrates an initial state during communication among three neighboring nodes according to the invention.
FIG. 4B illustrates a transitional state during communication among the three neighboring nodes.
FIG. 4C illustrates the steady state during communication among the three neighboring nodes.

In FIGS. 4A, 4B, and 4C there are two neighboring nodes j1 and j2 near the node of interest i. FIG. 4A shows an exemplary initial state, FIG. 4B shows a transitional state, and FIG. 4C shows the steady state in which the phases at the three nodes are mutually separated by 2π/3 radians. This state can also be thought of as being reached by mutual repulsion of point masses rotating around a circle. Similar operations occur when the number of neighboring nodes is three or more.

If the number of neighboring nodes changes during the course of system operation, the steady state changes adaptively. Assume, for example, that there is now one node neighboring the node of interest, and that a stable phase relationship has been established as in FIG. 3C. Then assume that one new neighboring node is added. The stability of the phase relationship is destroyed, but after passing through a transitional state, the system assumes a new steady state in which there are two neighboring nodes, as in FIG. 4C. Similar adaptation occurs when two or more new neighboring nodes are added, or when a neighboring node is removed or stops functioning.

The communication timing calculator 12 outputs the phase signal $\theta_i(t)$ that it generates to the impulse signal transmitter 13, steady-state decision unit 14, and data communication unit 15.

The impulse signal transmitter 13 transmits the output impulse signal according to the phase signal $\theta_i(t)$. That is, it transmits the output impulse signal when the phase signal $\theta_i(t)$ takes on a specific value α ($0 \leq \alpha \leq 2\pi$). It is desirable for a particular value of α to be uniformly set for the entire system. No generality is lost by assuming that α=0, so in the following description it will be assumed that α=0 uniformly throughout the system. In the example shown in FIGS. 3A, 3B, and 3C, since there is a phase difference π between the phase signals $\theta_i(t)$ and $\theta_j(t)$ of nodes i and j in the steady state, even if the uniformly set phase value α=0 is used throughout the system, there will be a phase difference π between the transmitting timings of the impulse signals from nodes i and j.

The steady-state decision unit 14 decides whether the transmission timings of the output impulse signals at its own node and neighboring nodes are in a transitional state (as in FIGS. 3B and 4B) or the steady state (as in FIGS. 3C and 4C). The steady-state decision unit 14 observes the timing of the received impulse signals (corresponding to the output impulse signal of the other node) and the timing of the output impulse signals from its own node, and decides that they are in the steady state if the timing difference remains temporally constant, or nearly constant. If the transmitting timings of a plurality of nodes that transmit and receive impulse signals to and from each other are stable over time, it decides that the transmitting timing is in the steady state. The steady-state decision unit 14 receives the phase signal $\theta_i(t)$ as a signal for acquiring the transmitting timing of the impulse signal from its own node.

The steady-state decision unit 14 can make the steady-state decision, for example, as follows.

(a) The value β of the phase signal $\theta_i(t)$ at the timing of generation of the received impulse signal from the impulse signal receiving unit 11 is observed for one period of the phase signal $\theta_i(t)$. Let the observed values β of the phase signal $\theta_i(t)$ be:

$\beta_1, \beta_2, \ldots, \beta_N (0<\beta_1<\beta_2<\ldots<\beta_N<2\pi)$ (b) The differences (phase differences) Δ between adjacent values are calculated from the observed values β of the phase signal $\theta_i(t)$.

$\Delta_1 = \beta_1, \Delta_2 = \beta_2 - \beta_1, \ldots, \Delta_N = \beta_N - \beta_{N-1}$ (c) Processes (a) and (b) above are carried out at intervals of one period of the phase signal $\theta_i(t)$ and the rate of change γ (differences) in the phase difference Δ between adjacent periods are calculated.

$\gamma_1 = \Delta_1(\tau+1) - \Delta_1(\tau), \gamma_2 = \Delta_2(\tau+1) - \Delta_2(\tau), \ldots, \gamma_N = \Delta_N(\tau+1) - \Delta_N(\tau)$ where τ indicates discrete time in units of one period of the phase signal $\theta_i(t)$.

(d) The steady state is recognized when the above rates of change γ are all smaller than a predetermined value ε.

$\gamma_1 < \epsilon, \gamma_2 < \epsilon, \ldots, \gamma_N < \epsilon$

It is also possible, however, to make the steady state decision according to whether the decision condition $\gamma_1 < \epsilon, \gamma_2 < \epsilon, \ldots, \gamma_N < \epsilon$ is satisfied over M periods (where M is an integer greater than two). The larger the value of M is, the more stable the state must be in order for the steady-state decision unit 14 to decide that the steady state has been reached. Alternatively, the decision may be based on only some of the received impulse signals.

At intervals equal to the period of the phase signal $\theta_i(t)$, the steady-state decision unit 14 sends the data communication unit 15 a steady-state decision signal indicating the decision result, and a slot signal equal to the minimum value $\beta_1$ of the value β of the phase signal $\theta_i(t)$.

The data communication unit 15 receives data transmitted by other nodes A and transmits data originating at or relayed by its own node. When the steady-state decision signal indicates that the steady state has been recognized, the data communication unit 15 transmits data in a time slot as described below. (The term 'time slot' will be used even though it does not indicate a fixed time interval allocated by the system.) When the steady-state decision signal indicates a transitional state, the data communication unit 15 does not transmit data.

A time slot is a time interval during which $\theta_i(t)$ satisfies the following condition:

$\delta_1 < \theta_i(t) < \beta_1 - \delta_2$

The time slot starts at a timing following the transmission of the output impulse signal (the phase signal value at this point is assumed to be $\delta_1$), and ends at a time $\beta_1 - \delta_2$ preceding the generation of the closest received impulse signal, offset by an amount $\delta_2$ from the timing $\beta_1$ of that received impulse signal. The parameters $\delta_1$ and $\delta_2$ are phase widths representing very short spaces of time that assure that impulse signals transmitted from the transmitting node or another neighboring node and data signals transmitted from the transmitting node or another neighboring node are not both present in the space near the transmitting node at the same time.

In the steady state shown in FIG. 3C, for example, node i starts transmitting an impulse signal at phase zero ($\theta_i(t)=0$), ends transmission of the impulse signal before phase $\delta_1$, starts transmission of the data signal at phase $\delta_1$ ($\theta_i(t)=\delta_1$), ends transmission of the data signal at phase $\beta_1 - \delta_2$ ($\beta_1 = \pi$), and does not transmit further impulse signals or data signals until the phase returns to zero. The neighboring node j carries out similar operations in relation to phase $\theta_j$; the phase difference of $\pi$ between $\theta_i$ and $\theta_j$ prevents the transmitted data and impulse signals from colliding. Three or more neighboring nodes can carry out transmission and similarly avoid collisions of transmitted data.

Although it is possible for a group of nodes operating with different natural angular frequencies to reach a steady state, the steady state can be reached most quickly and easily if all of the nodes have the same natural angular frequency parameter $\omega$, as is implicitly assumed in the description above. To ensure that a uniform natural angular frequency parameter $\omega$ is used throughout the communication system, the first embodiment provides an angular frequency receiving unit 16 and angular frequency storage unit 17 in each general node A, and provides a beacon node B.

Before the functions of the angular frequency receiving unit 16 and angular frequency storage unit 17 in a general node A are described, the internal structure of the beacon node B will be described.

Figure 5:
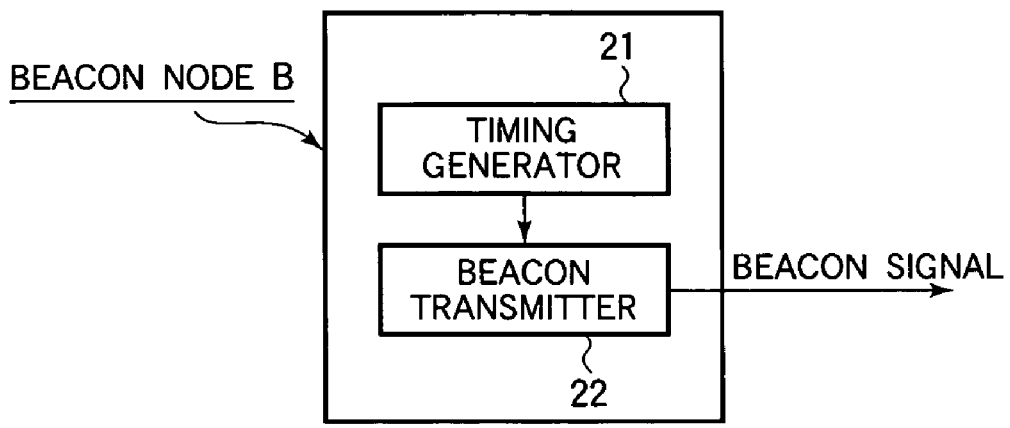
FIG. 5 is a functional block diagram showing the internal structure of the beacon node in FIG. 1.

Referring to FIG. 5, the beacon node B has a timing generator 21 and a beacon transmitter 22. The timing generator 21 outputs timing signals at the cycle time T of the natural angular frequency $\omega$ to the beacon transmitter 22. The cycle time T can be generated by counting a high speed clock signal, for example. The beacon node B may also have a setting device that can be set to different natural angular frequencies $\omega$, and the timing generator 21 may output timing signals responsive to the set natural angular frequency $\omega$.

The beacon transmitter 22 outputs a (radio) beacon signal to the outside world each time it receives a timing signal from the timing generator 21.

The beacon signal transmitted by the beacon transmitter 22 in the beacon node B is received by each general node A.

The angular frequency receiving unit 16 receives the beacon signal, obtains the value of the natural angular frequency $\omega$ by measuring the intervals at which beacon signals arrive, and writes this value into the angular frequency storage unit 17. The angular frequency storage unit 17 stores the value of the natural angular frequency parameter $\omega$, which is referenced by the communication timing calculator 12 as necessary.

The value of the natural angular frequency $\omega$ that is stored by the angular frequency storage unit 17 is not fixed. If the timing generator 21 in the beacon node B changes the cycle time T of the timing signal, there is a corresponding change in the transmission timing of the beacon signal, causing the value of the natural angular frequency parameter $\omega$ output from the angular frequency receiving unit 16 in node A to change, and the value of $\omega$ stored by the angular frequency storage unit 17 is changed accordingly.

Figure 6:
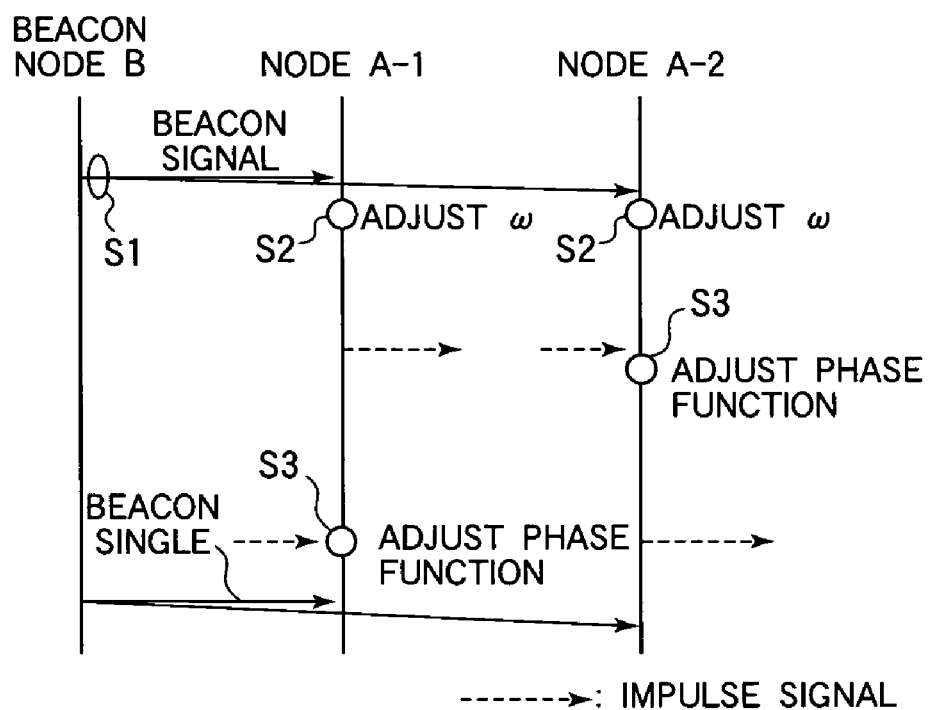
FIG. 6 illustrates a sequence of node operations in the first embodiment.

The communication timing control sequence is illustrated in FIG. 6. Only control signals are shown in FIG. 6; data signals are omitted. The circles indicate the timing of changes in the basic angular velocity and the phase signals.

Figure 7:
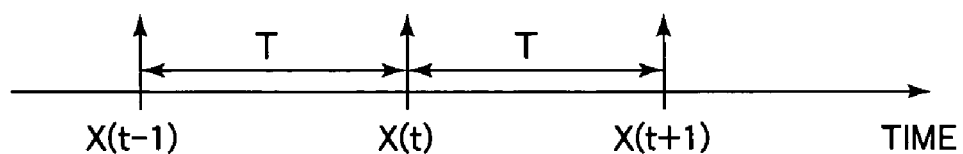
FIG. 7 illustrates the timing of the beacon signal in the first embodiment.
Figure 8:
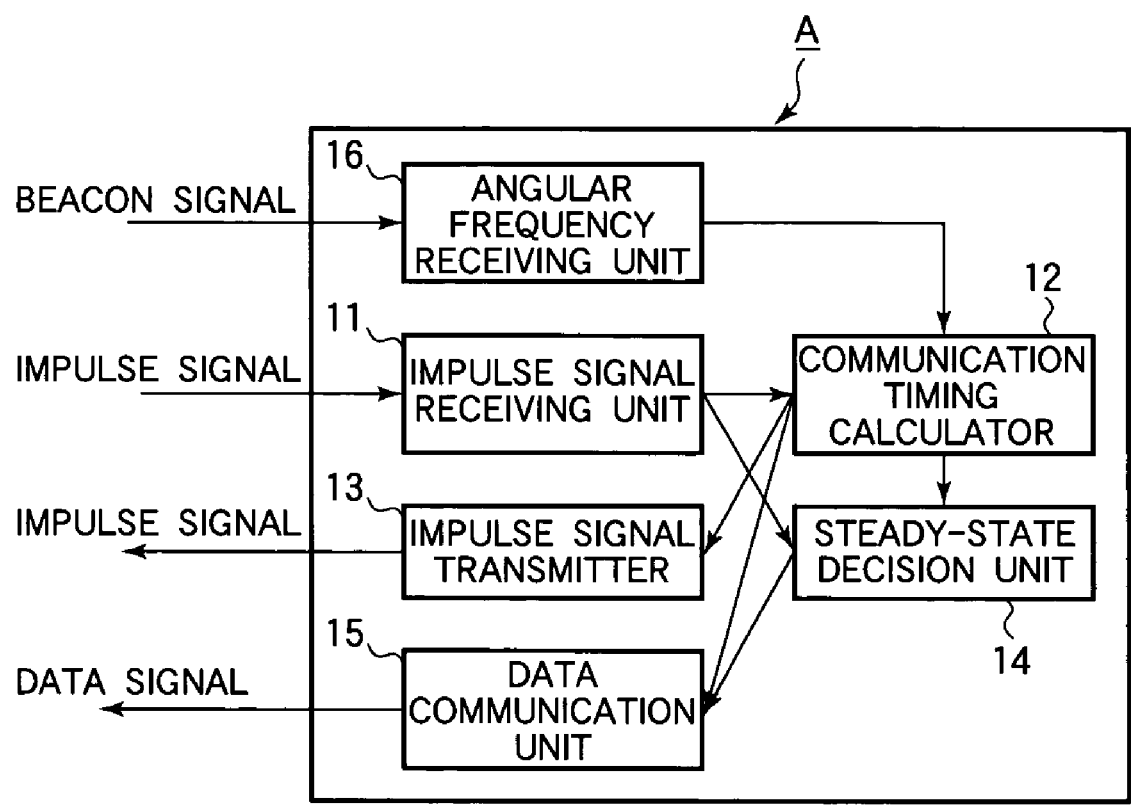
FIG. 8 is a functional block diagram showing the internal structure of a general node in FIG. 1 according to a second embodiment of the invention.

The timing generator 21 in the beacon node B sends beacon transmission requests to the beacon transmitter 22 at beacon signal transmission timings X(t) separated by time intervals T as shown in FIG. 7. Based on this timing, beacon signals are transmitted from the beacon transmitter 22 to the network, and are received by the angular frequency receiving unit 16 in each of nodes A-1, A-2, . . . (step S1).

The angular frequency receiving unit 16 modifies the natural angular frequency parameter $\omega$ according to the timing of the previously received beacon signal and the newly received beacon signal, and stores the modified value in the angular frequency storage unit 17 (step S2). The value of $\omega$ is recalculated at each node A-1, A-2, . . . from the beacon signal reception time interval T (the interval between successive beacon reception times X(t−1) and X(t)) according to equation (3).

$$2\pi/T = 2\pi/(X(t-1)-X(t-1)) = \omega \qquad (3)$$

The communication timing calculator 12 at each node A-1, A-2, . . . generates phase signals and modifies the phase response function by using the natural angular frequency parameter $\omega$ stored in the angular frequency storage unit 17 (step S3).

The first embodiment provides the following effects.

While a conventional TDMA system has an administrative node allocate time slots, the first embodiment dispenses with the administrative node and instead lets each node allocate its own time slots by interaction with its neighboring nodes. The individual nodes adjust their own time slots interactively and autonomously. The first embodiment, therefore, can avoid disasters such as loss of communication at all nodes due to failure of the administrative node.

In the first embodiment, if nodes are added to or removed from the network, or fail or are moved to other locations, the nodes affected by the change can autonomously and adaptively reallocate their time slots, while other nodes, not affected by the change, need not reallocate their time slots and accordingly can continue data communication without interruption.

Because the autonomous mutual adjustment of time slots is carried out among neighboring nodes, mutually distant nodes can transmit data at the same time. Although the data transmission timings at different points in the system may overlap, wherever interference between neighboring nodes may occur, the nodes concerned perform an autonomous and mutual adjustment of their time slot allocations to avoid collisions of transmitted data.

The first embodiment may operate in a mode in which only nodes that generate data communication traffic transmit impulse signals. In this mode, each time the set of nodes generating traffic changes, the time slots are reassigned so that the nodes generating data traffic can communicate as efficiently as possible.

By providing a beacon node B that transmits a beacon signal over the network at fixed time intervals, and having each node A receive the beacon signal and adjust its natural angular frequency parameter $\omega$ to match the beacon cycle, thereby establishing a uniform value of the natural angular frequency parameter $\omega$, the first embodiment makes the steady state easier to reach than it would be if all nodes did not use the same value of $\omega$.

Each node A determines the value of the natural angular frequency parameter $\omega$ by using the beacon signals received at fixed time intervals from the beacon node B, so it is not necessary to preset the natural angular frequency parameter $\omega$ in each node A, and if the value of the natural angular frequency parameter $\omega$ has to be changed because of a change in network conditions, only the value stored in the beacon node B has to be changed; it is not necessary to change a setting at every node.

Second Embodiment

Next a second embodiment of the communication timing control apparatus, communication timing control method, and node and communication system of the present invention will be described with reference to the drawings. The communication system (network) in the second embodiment has general nodes A and a beacon node B; beacon node B is the same as in the first embodiment but the general nodes A are altered. More specifically, the general nodes A lack the angular frequency storage unit (shown in FIG. 2) that stored the recalculated natural angular frequency parameter in the first embodiment, and the functions of the angular frequency receiving unit 16 and communication timing calculator 12 are altered.

In the second embodiment, the angular frequency receiving unit 16 receives the beacon signal and sends it to the communication timing calculator 12 without performing other operations.

The communication timing calculator 12 treats the beacon signal received from the angular frequency receiving unit 16 as a received impulse signal and carries out the calculations given in the first embodiment, using equations (1) and (2).

Figure 9A:
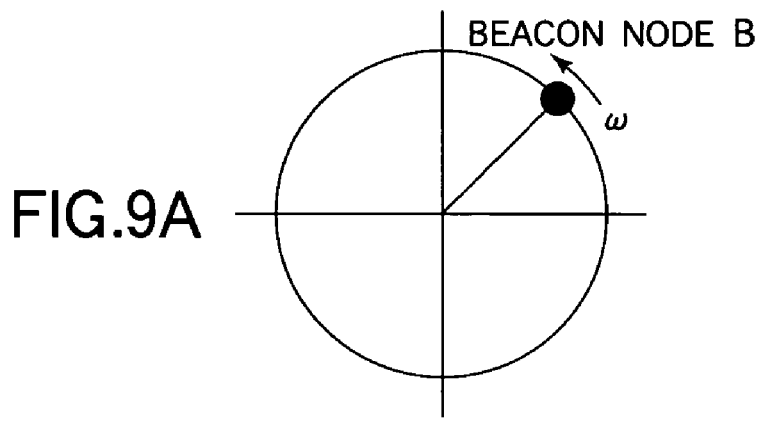
FIG. 9A illustrates an initial state in the second embodiment.

Since the beacon node B does not have a communication timing calculator 12, it does not generate a phase signal, but since it outputs a beacon signal at regular intervals corresponding to the angular frequency parameter $\omega$, its operation can be depicted by means of a phase circle as in FIG. 9A, the beacon signal being output at phase zero. The timing of the beacon signals does not change in response to impulse signals from other nodes A.

Figure 9B:
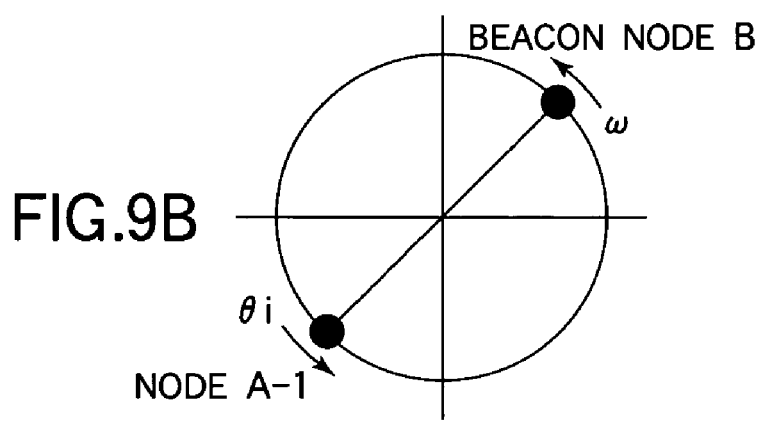
FIGS. 9B and 9C illustrate steady states in the second embodiment.

If a single node A-1 is within range of the beacon but does not receive impulse signals from any other node, node A-1 adjusts the timing of its internal phase signal according to a repulsion rule generally similar to the rule given by equations (1) and (2) while the beacon node B continues to transmit beacon signals at fixed time intervals T. When the steady state is reached, the timing phase of the output impulse signals transmitted by node A-1 is exactly reverse to the timing phase of the beacon signal (the phase difference is $\pi$ radians) as shown in FIG. 9B. Node A-1 now continues to transmit impulse signals at fixed time intervals T determined by the natural angular frequency parameter $\omega$.

Figure 9C:
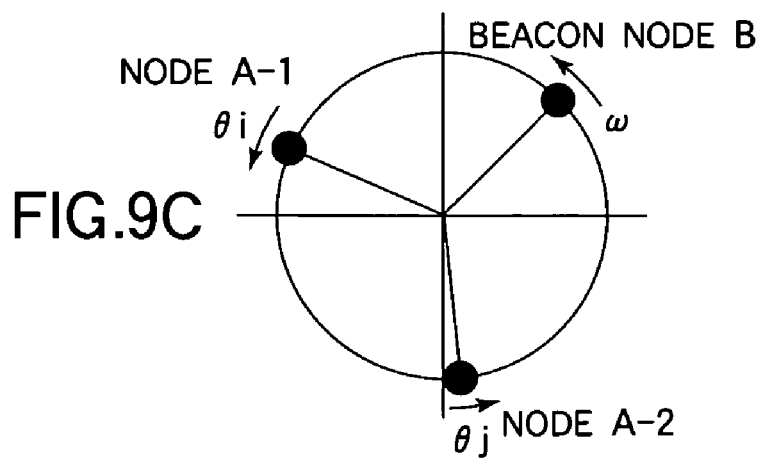

If another general node A-2 is added so that nodes A-1 and A-2 both receive the beacon signal and also interact by receiving each other's impulse signals, nodes A-1 and A-2 both adjust the timing of their internal phase signals according to the repulsion rule, reaching the steady state shown in FIG. 9C. Since the beacon node B continues to transmit the beacon signal at fixed time intervals T determined by the natural angular frequency parameter $\omega$, nodes A-1 and A-2 also transmit impulse signals at fixed time intervals of T, thus operating in accordance with the natural angular frequency parameter $\omega$.

In the second embodiment, accordingly, although the beacon signal is treated as an impulse signal, general nodes A obtain the natural angular frequency parameter $\omega$ from the beacon signal by adjusting their phase relationships to it. Every time a general node A is added or removed from the network, or moves to a different location, the phase relationships are readjusted, but they reach a steady state in which each general node A transmits impulse signals at the fixed time interval T determined by the natural angular frequency parameter $\omega$.

The second embodiment produces substantially the same effect as the first embodiment: a plurality of nodes A adjust their transmission timing autonomously so as to reach a steady state in which collisions do not occur.

In the second embodiment, the communication timing calculator 12 in each general node A receives the beacon signal together with the impulse signals of other general nodes and generates the phase signal by treating the beacon signal as an impulse signal. The natural angular frequency of the beacon signal is thereby propagated from the beacon node B to the general nodes A without the need to store the natural angular frequency parameter in each general node, so the general nodes A have a simpler structure than in the first embodiment.

In the second embodiment, data transmission time slots can also be allocated to the beacon node B, and can be used to broadcast data from the beacon node B to all of the general nodes A.

Third Embodiment

Next a third embodiment of the communication timing control apparatus, communication timing control means, and node and communication system will be described with reference to the drawings.

Figure 10:
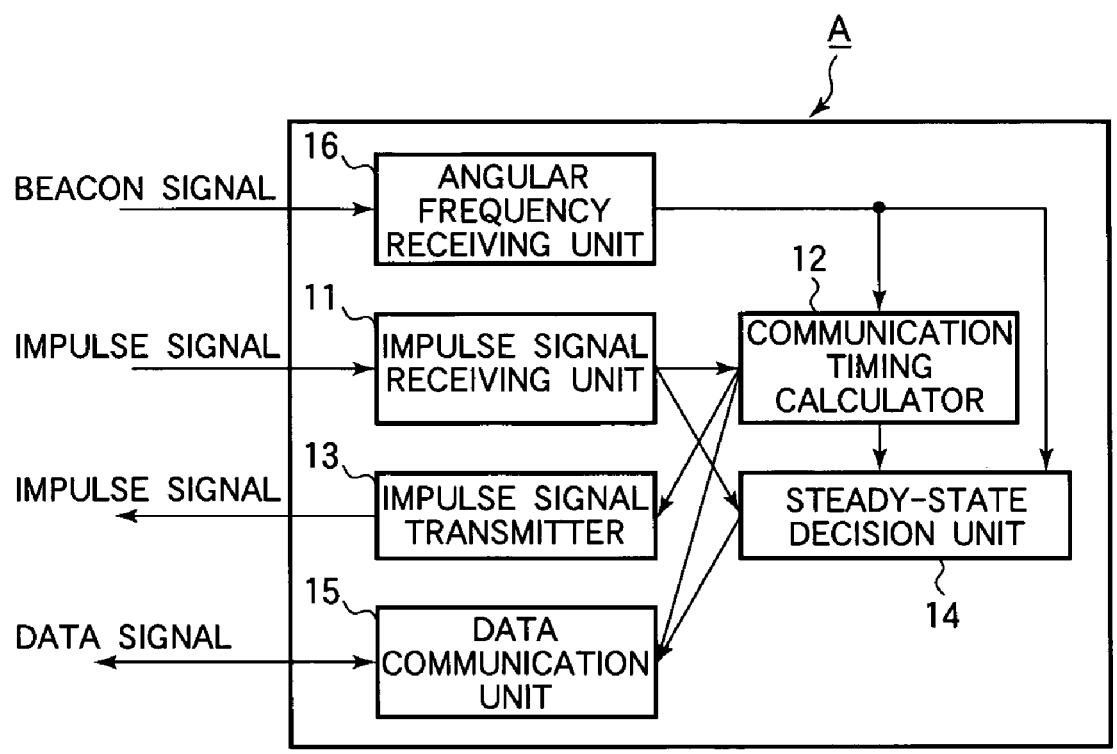
FIG. 10 is a functional block diagram showing the internal structure of a general node in FIG. 1 according to a third embodiment of the invention.

The communication system (network) in the third embodiment also has a plurality of general nodes A and a beacon node B. The beacon node B is the same as in the first embodiment, but the general nodes A now have the internal structure shown in FIG. 10.

The third embodiment differs from the second embodiment in that the beacon signal received from the angular frequency receiving unit 16 is sent not only to the communication timing calculator 12 but also to the steady-state decision unit 14, and also in that the steady-state decision unit 14 uses the beacon signal from the angular frequency receiving unit 16 to decide whether or not the phase relationship between its own node and neighboring nodes is in a stable (steady) state.

The steady-state decision operations carried out by the steady-state decision unit 14 in the third embodiment will be described below.

The steady-state decision unit 14 in the third embodiment recognizes the steady state by checking the stability of the time intervals between the arrival of impulse signals from neighboring nodes A and the arrival of beacon signals.

Assuming that the value of the phase signal from the communication timing calculator 12 at the input timing of a beacon signal is $\beta_0$, and the values of phase signals from the communication timing calculator 12 at the receiving timings of impulse signals from the plurality of node A are $\beta_1$, $\beta_2$, ... $\beta_N$, the steady-state decision unit 14 first calculates the phase difference between the input timing of the beacon signal and the receiving timing of the impulse signal from each node A:

$\Delta_0 = \beta_0, \Delta_1 = \beta_1 - \beta_1, \ldots, \Delta_N = \beta_N - \beta_{N-1}$ This calculation is carried out cyclically at intervals equal to the period of the beacon signal.

Next, the amounts of variation of these phase differences are determined:

$\gamma_0 = \Delta_0(\tau+1) - \Delta_0(\tau), \gamma_1 = \Delta_1(\tau+1) - \Delta_1(\tau), \ldots, \gamma_N = \Delta_N(\tau+1) - \Delta_N(\tau)$ The steady-state decision unit 14 recognizes the steady state when all of these values are less than a predetermined value $\epsilon$, that is, when $\gamma_0 < \epsilon, \gamma_1 < \epsilon, \ldots, \gamma_N < \epsilon.$ In the first embodiment and the second embodiment, as described above, the steady-state decision is based on the values $\beta_1, \beta_2, \ldots,$ and $\beta_N$, while in the third embodiment, the value $\beta_0$ representing the input timing of the beacon signal is also taken into consideration. The beacon signal is transmitted at a constant phase regardless of operations at other nodes, so when a general node A is in the steady state, the length of the intervals at which it transmits impulse signals is close to the interval between beacon signals. It is therefore possible to tell which nodes A are operating in the steady state by checking the stability of the time intervals between reception of their impulse signals and reception of the beacon signal.

The third embodiment produces the same effects as the second embodiment, but by using the input timing of the beacon signal, it can recognize the steady state with greater accuracy, and one general node A can determine which other general nodes A are converging on the steady state.

Fourth Embodiment

Next, a fourth embodiment of the communication timing control apparatus, communication timing control method, node, and communication system will be described.

Figure 11:
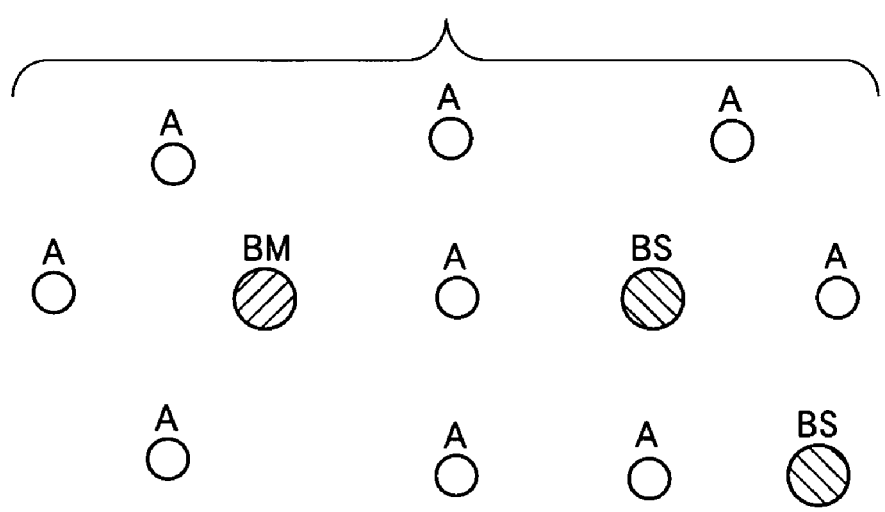
FIG. 11 schematically depicts a communication system comprising a plurality of nodes in a fourth embodiment of the invention.

Referring to FIG. 11, the communication system has a plurality of nodes A that carry out data communication, and a plurality of spatially distributed beacon nodes that supply beacon signals to the general nodes A. The beacon nodes include one master beacon node BM and a plurality of slave beacon nodes BS.

Some of the general nodes A may double as beacon nodes BM or BS. Each of the nodes, including the general nodes A, master beacon node BM, and slave beacon nodes BS, may be either stationary or movable.

The master beacon node BM has the same structure as the beacon node B in the preceding embodiments (see FIG. 5) and transmits the same type of beacon signal, so a detailed description will be omitted.

Each of the slave beacon nodes BS acts as a beacon relay node by transmitting a beacon signal whenever it receives a beacon signal from the master beacon node BM or another slave beacon node BS.

Figure 12:
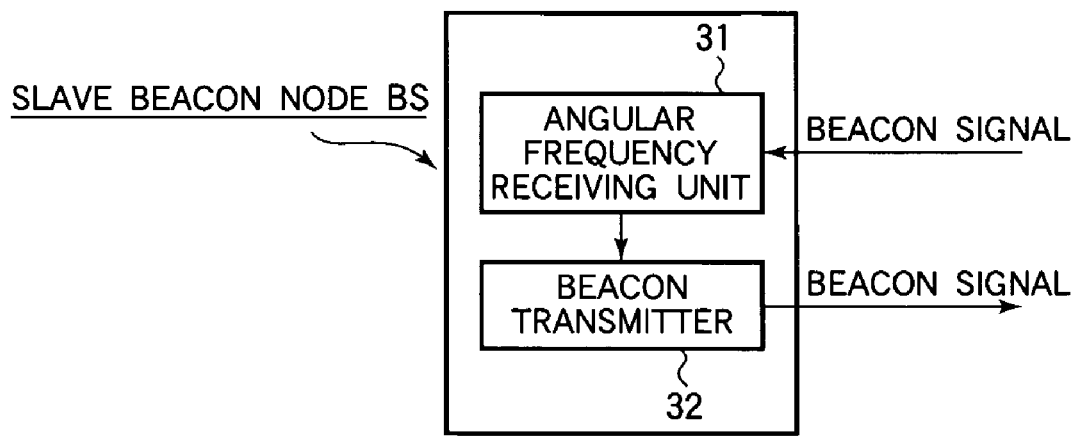
FIG. 12 is a functional block diagram showing the internal structure of a slave beacon node in FIG. 11.

As shown in FIG. 12, each of the plurality of slave beacon nodes BS has an angular frequency receiving unit 31 and a beacon transmitter 32. The angular frequency receiving unit 31 is similar to the angular frequency receiving unit 16 in the general nodes A in the second and third embodiments: it receives the beacon signal, and sends the received beacon signal to the beacon transmitter 32. The beacon transmitter 32 is similar to the beacon transmitter 22 in the beacon node B in the preceding embodiments: it uses the received beacon signal as a timing signal to transmit a beacon signal to other nodes.

The beacon signal transmitted by the beacon transmitter 32 at a slave beacon node BS is identical to the beacon signal received by the angular frequency receiving unit 31. Accordingly, there is no detectable difference between the beacon signal received from the master beacon node BM and a beacon signal received from a slave beacon node BS.

Figure 13:
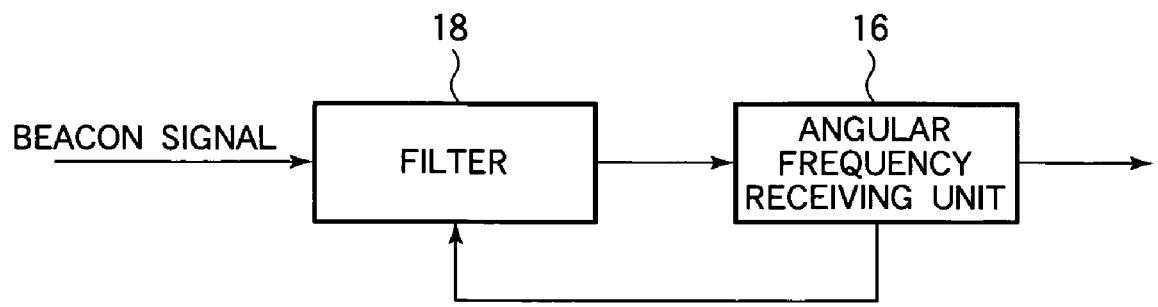
FIG. 13 is a functional block diagram showing part of the internal structure of a general node in FIG. 11.

The internal structure of the general nodes A in the fourth embodiment is substantially the same as in any one of the preceding embodiments, but differs in that a filter 18 is added as a preceding stage to the angular frequency receiving unit 16, as shown in FIG. 13. In the fourth embodiment, a node A may receive a plurality of beacon signals from the beacon nodes BM, BS, and the timing of the received beacon signals may differ slightly due to differences in distance from the transmitting beacon node. The filter 18 passes the beacon signal from one beacon node and filters out the beacon signals from other beacon nodes, so that the angular frequency receiving unit 16 receives only one beacon signal. The beacon signal input to the angular frequency receiving unit 16 may originate at the master beacon node BM or any one of the slave beacon nodes BS. The filter 18 is originally inactive, but when the angular frequency receiving unit 16 recognizes that it is receiving a plurality of beacon signals arriving at different timings, it selects one of the received beacon signals and commands the filter 18 to pass this signal while blocking the other beacon signals.

The decision as to whether there are a plurality of beacon signals arriving at different timings can be made, for example, as follows. A minimum time slot width can be predetermined, and if beacon signals arrive at timings separated by less than this time slot width, they are recognized as arriving from different beacon nodes. If the interval between incoming beacon signals is equal to or greater than the minimum time slot width, the beacon signals are recognized as originating from the same beacon node. Alternatively, if all beacon signals are received at equal intervals, they are recognized as coming from a single beacon node, whereas if they are separated by intervals of different lengths, they are recognized as arriving from different beacon nodes.

The fourth embodiment produces effects similar the effects of the preceding embodiments, and also produces the following effects.

By providing a plurality of beacon nodes and using some of them as slave beacon nodes to relay a beacon signal transmitted from a master beacon node, the fourth embodiment enables communication timing to be controlled autonomously in even a large network or communication system.

The filter 18 that precedes the angular frequency receiving unit 16 enables each general node A to operate according to a single beacon signal, even if it receives beacon signals from a plurality of beacon nodes. This arrangement makes it easier for the node A to reach a steady state by controlling variations in the natural angular frequency value $\omega$.

Other Embodiments

The angular frequency receiving unit 16 described in the preceding embodiments is specialized for receiving beacon signals, but this function may be combined with the function of the impulse signal receiving unit 11. In another exemplary embodiment, beacon signals and impulse signals are the same except that both include additional identifying information (IDs) by which impulse signals can be distinguished from beacon signals. Instead of an angular frequency receiving unit 16, each general node A has means for determining whether the signals received by the impulse signal receiving unit 11 are impulse signals or beacon signals and switching the signals to different destinations accordingly.

Internal state transition timings (represented by the phase signal) need not be controlled according to equations (1) and (2). Other computational formulas that employ a natural angular frequency $\omega$ obtained from or propagated by a beacon signal can be used instead.

The preceding embodiments use the same natural angular frequency value $\omega$ at each general node A, but even though all general nodes A derive their natural angular frequencies from the same beacon signal, the natural angular frequency value may differ from one general node to another. For example, one general node may operate according to the natural angular frequency $\omega$ of the beacon signal and another general node may operate at twice this natural angular frequency ($2 \times \omega$), deriving its internal timing from half the interval between successive beacon signals.

A basic feature of the present invention is that information required for autonomous distributed timing decisions is transmitted to each node, or propagated from one node to another; the method by which the autonomous distributed timing decisions are made is not limited to the methods described in the embodiments above. It is also possible to use the methods shown in the specification and drawings of, for example, Japanese Patent Application No. 2003-328530, the content of which is included herein by reference.

The present invention is applicable not only to wireless communication but also to wired communication.

Those skilled in the art will recognize that further variations are possible within the scope of invention, which is defined by the appended claims.

What is claimed is:

1. A communication system including a plurality of nodes that transmit data to each other, wherein each one of the nodes includes a communication timing control apparatus comprising:
   a first transmitter for periodically transmitting, to at least another one of the nodes, an output state variable signal, separate from said data, indicating a rhythmic operating state or operating timing of the node including the timing control apparatus;
   a first receiving unit for receiving, from the at least another one of the nodes, an input state variable signal, separate from said data, indicating a rhythmic operating state or operating timing of the at least another one of the nodes;
   a timing decision unit for causing transitions in the rhythmic operating state or operating timing of the node including the timing control apparatus to occur according to a basic transition rate and the input state variable signals received by the first receiving unit, generating the output state variable signal by taking said transitions into account, sending the output state variable signal to the first transmitter, and using said transitions to schedule data transmissions to the at least another one of the nodes;
   a second receiving unit for receiving a control signal from an external source, the control signal being separate from the input state variable signal, the control signal determining the basic transition rate; and
   a steady-state decision unit for deciding whether timing relationships among the input state variable signals and the output state variable signal are in a steady state or a transitional state.

2. The communication system of claim 1, wherein the second receiving unit determines the basic transition rate from a rate at which the control signal is received from the external source, the communication timing control apparatus at each node further comprising:
   a storage unit for storing information indicating the basic transition rate determined by the control signal receiving unit and supplying said information to the timing decision unit for use by the timing decision unit.

3. The communication system of claim 1, further comprising a control node having a second transmitter for transmitting the control signal.

4. The communication system of claim 3, wherein the second transmitter transmits the control signal at regular intervals, the regular intervals being externally selectable.

5. The communication system of claim 3, further comprising a slave node for relaying the control signal transmitted by the control node.

6. The communication system of claim 3, further comprising a plurality of slave nodes for relaying the control signal transmitted by said control node.

7. The communication system of claim 1, one of the nodes having a second transmitter for transmitting the control signal.

8. The communication system of claim 7, also including at least one slave node for relaying the control signal transmitted by said one of the nodes.

9. The communication system of claim 7, wherein at least one of the nodes has a third transmitter for relaying the control signal transmitted by said one of the nodes.

10. A communication system including a plurality of nodes that transmit data to each other, wherein each one of the nodes includes a communication timing control apparatus comprising:
    a first transmitter for periodically transmitting, to at least another one of the nodes, an output state variable signal, separate from said data, indicating a rhythmic operating state or operating timing of the node including the timing control apparatus;
    a first receiving unit for receiving, from the at least another one of the nodes, an input state variable signal, separate from said data, indicating a rhythmic operating state or operating timing of the at least another one of the nodes;
    a timing decision unit for causing transitions in the rhythmic operating state or operating timing of the node including the timing control apparatus to occur according to a basic transition rate and the input state variable signals received by the first receiving unit, generating the output state variable signal by taking said transitions into account, sending the output state variable signal to the first transmitter, and using said transitions to schedule data transmissions to the at least another one of the nodes; and
    a second receiving unit for receiving a control signal from an external source, the control signal being separate from the input state variable signal, the control signal determining the basic transition rate;
    wherein the second receiving unit supplies the received control signal to the timing decision unit, and the timing decision unit causes said transitions to occur according to both the input state variable signals and the received control signal, using the received control signal and the input state variable signals in like manner;
    the communication system further comprising a steady-state decision unit for deciding whether timing relationships among the control signal, the input state variable signal, and the output state variable signal are in a steady state or a transitional state.

11. A communication timing control method carried out by each of a plurality of nodes that transmit data to each other in a communication system, comprising:
    receiving, from at least one other node in the communication system, an input state variable signal, separate from said data, indicating a rhythmic operating state or operating timing of said at least one other node;
    receiving, from an external source, a control signal separate from the input state variable signal, the control signal indicating a basic transition rate;
    generating a transition in a rhythmic internal operating state or operating timing at said basic transition rate, at timings adjusted according to the input state variable signal received from said at least one other node;
    generating an output state variable signal according to said transition;
    deciding whether timing relationships among the input state variable signals and the output state variable signal are in a steady state or a transitional state;
    transmitting the output state variable signal to said at least one other node; and
    using said transitions to schedule data transmissions to the at least one other node.

12. The communication timing control method of claim 11, wherein the external source is a control node in the communication system.

* * * * *

UNITED STATES PATENT AND TRADEMARK OFFICE
CERTIFICATE OF CORRECTION

PATENT NO.        : 7,602,764 B2                                      Page 1 of 1
APPLICATION NO. : 11/072234
DATED             : October 13, 2009
INVENTOR(S)       : Matsunaga et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1106 days.

Signed and Sealed this

Fifth Day of October, 2010

David J. Kappos
*Director of the United States Patent and Trademark Office*